United States Patent
Johnson et al.

(10) Patent No.: US 10,409,982 B2
(45) Date of Patent: Sep. 10, 2019

(54) SECURE DATA ACCESS FOR MULTI-PURPOSE MOBILE DEVICES

(75) Inventors: Nigel Paul Johnson, Ottawa (CA); Dorwin T. Shields, Jr., Allen, TX (US); Bryan Adam Joyner, Richardson, TX (US)

(73) Assignee: ZixCorp Systems, Inc., Dallas, TX (US)

( * ) Notice: Subject to any disclaimer, the term of this patent is extended or adjusted under 35 U.S.C. 154(b) by 0 days.

(21) Appl. No.: 13/551,972

(22) Filed: Jul. 18, 2012

(65) Prior Publication Data

US 2014/0026187 A1 Jan. 23, 2014

(51) Int. Cl.
*G06F 21/53* (2013.01)
*H04L 29/06* (2006.01)
*H04L 29/08* (2006.01)

(52) U.S. Cl.
CPC .......... *G06F 21/53* (2013.01); *H04L 63/0281* (2013.01); *H04L 63/08* (2013.01); *H04L 67/04* (2013.01); *H04L 67/2842* (2013.01)

(58) Field of Classification Search
CPC . H04L 63/0281; H04L 63/0272; H04L 63/08; H04L 67/04; H04L 67/2842; G06F 3/14; G06F 21/00; G06F 21/53
See application file for complete search history.

(56) References Cited

U.S. PATENT DOCUMENTS

| 7,496,762 B1 | 2/2009 | Boydstun et al. |
| 8,117,269 B2 | 2/2012 | Sylthe et al. |
| 8,145,766 B2 | 3/2012 | Dumitru et al. |
| 8,453,051 B1* | 5/2013 | Weiss et al. .................. 715/240 |
| 2004/0139396 A1 | 7/2004 | Gelernter et al. |
| 2004/0230648 A1 | 11/2004 | Teh et al. |
| 2005/0154885 A1* | 7/2005 | Viscomi .............. G06F 9/44521 713/165 |
| 2007/0263007 A1* | 11/2007 | Robotham et al. ........... 345/581 |
| 2009/0006423 A1* | 1/2009 | Crawford ........................ 707/10 |

(Continued)

OTHER PUBLICATIONS

PCT Notification of Transmittal of the International Search Report and the Written Opinion of the International Searching Authority, or the Declaration, 11 pages, dated Jan. 9, 2014.

(Continued)

*Primary Examiner* — Ashokkumar B Patel
*Assistant Examiner* — Forrest L Carey
(74) *Attorney, Agent, or Firm* — Baker Botts L.L.P.

(57) ABSTRACT

According to some embodiments, a proxy server comprises one or more processors operable to establish communication with a secure client application of a device. The client is configured with a partition that contains data received from the proxy server within the secure application. If the client passes authentication, the server communicates preview information to the client previewing files that the server received from a business server on behalf of the client. The client requests a selected file. The server renders the selected file into a first portion and a second portion based on the immediate display capabilities of the client. The server communicates the first portion, determines that a trigger point was reached, and then communicates the second portion in response to the trigger point being reached. The client is configured to delete the first portion and the second portion in response to a completion event.

57 Claims, 3 Drawing Sheets

(56) References Cited

U.S. PATENT DOCUMENTS

| | | | |
|---|---|---|---|
| 2009/0043865 A1* | 2/2009 | Dumitru et al. | 709/217 |
| 2009/0249440 A1* | 10/2009 | Platt et al. | 726/1 |
| 2010/0306528 A1* | 12/2010 | Andress et al. | 713/153 |
| 2011/0107437 A1 | 5/2011 | Goyal et al. | |
| 2011/0145564 A1 | 6/2011 | Moshir et al. | 713/154 |
| 2011/0283198 A1* | 11/2011 | Rybak et al. | 715/738 |
| 2012/0084184 A1 | 4/2012 | Raleigh et al. | |
| 2012/0131685 A1* | 5/2012 | Broch et al. | 726/30 |
| 2012/0179787 A1 | 7/2012 | Walsh et al. | |
| 2012/0254944 A1* | 10/2012 | Kamat et al. | 726/3 |
| 2012/0311659 A1 | 12/2012 | Narain et al. | |
| 2013/0347053 A1* | 12/2013 | Motoyama | G06F 21/6218 726/1 |

OTHER PUBLICATIONS

European Patent Office Search re Application No. 13820012.6-1853/ 2875424 PCT/US 2013050177 dated Apr. 18, 2016.
European Patent Office, Communication Pursuant to Article 94(3) EPC issued in European Patent Application No. EP 13 820 012.6, dated Nov. 22, 2017.

\* cited by examiner

SECURE DATA ACCESS FOR MULTI-PURPOSE MOBILE DEVICES

FIELD OF THE INVENTION

The invention relates generally to data security and more particularly to secure data access for multi-purpose mobile devices.

BACKGROUND

Mobile devices have become one of the basics for providing convenient access to email and other data. Mobile devices may be used to access personal data as well as business data. While some people carry several mobile devices (e.g., one for personal purposes and another for business purposes), it is becoming more and more common for people to consolidate personal data and business data onto one multi-purpose mobile device. Thus, the same mobile device used to store family photographs and personal apps may also be used to access business email, business contacts, business calendars, and other business-related data.

In some cases, each user (rather than the business) chooses his or her particular mobile device from a wide array of devices available on the market. The user will typically choose the device based on the brand, model, service provider, or other criteria that best meets his or her personal purposes. A device chosen based on the user's personal purposes, however, may fail to provide an adequate level of security to business-related data. Thus, the business-related data may be at risk if the device becomes lost or stolen.

SUMMARY

According to some embodiments, a proxy server comprises one or more processors operable to establish communication with a secure client application of a device. The client is configured with a partition that contains data received from the proxy server within the secure application. If the client passes authentication, the server communicates preview information to the client previewing files that the server received from a business server on behalf of the client. The client requests a selected file. The server renders the selected file into a first portion and a second portion based on the immediate display capabilities of the client. The server communicates the first portion, determines that a trigger point was reached, and then communicates the second portion in response to the trigger point being reached. The client is configured to delete the first portion and the second portion in response to a completion event.

Some embodiments of the disclosure may provide one or more technical advantages. A technical advantage of certain embodiments may be that a security system comprising a remote server and a secure client application executed on the user's mobile device determines what business data to communicate to the device, how much business data to communicate to the device, and when to delete the business data from the device. Thus, security over the business data may be effected by the security system without relying on the user of the device to secure the business data. As an example, the security system may enforce security policies configured to allow certain business data to be temporarily displayed to the user (e.g., when the user is authenticated and actively using the data) and then deleted from the device (e.g., when the user is de-authenticated or not actively using the data). Because security does not depend on the user, it may be possible to minimize the local restrictions or controls that the user's business might otherwise place on the user's mobile device. Accordingly, the user may have more control over choosing the type of device as well as the types of apps installed on the device in order to better meet the user's personal purposes.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
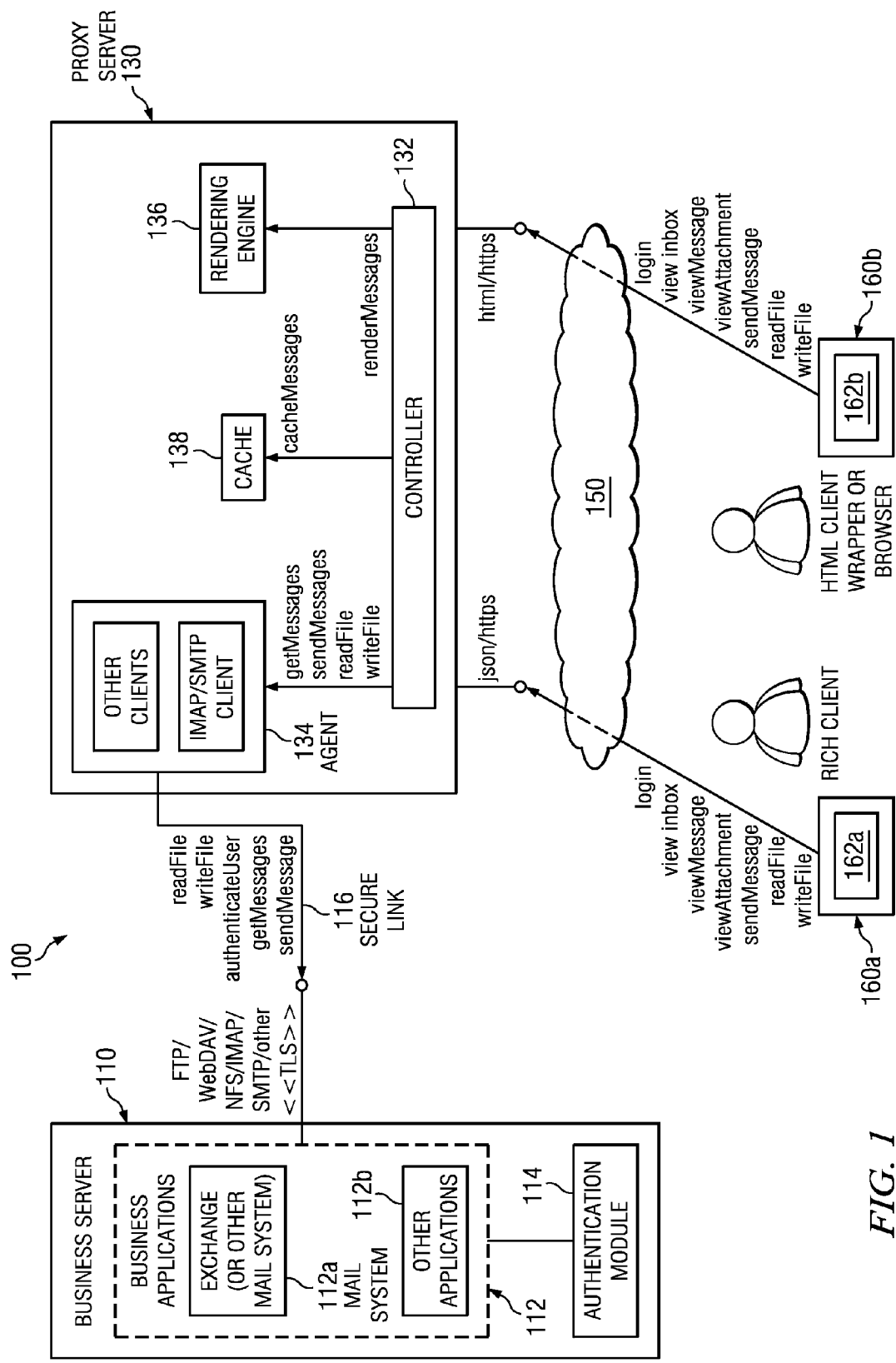
FIG. 1 illustrates an example of a system for securing data access for multi-purpose mobile devices.
Figure 2:
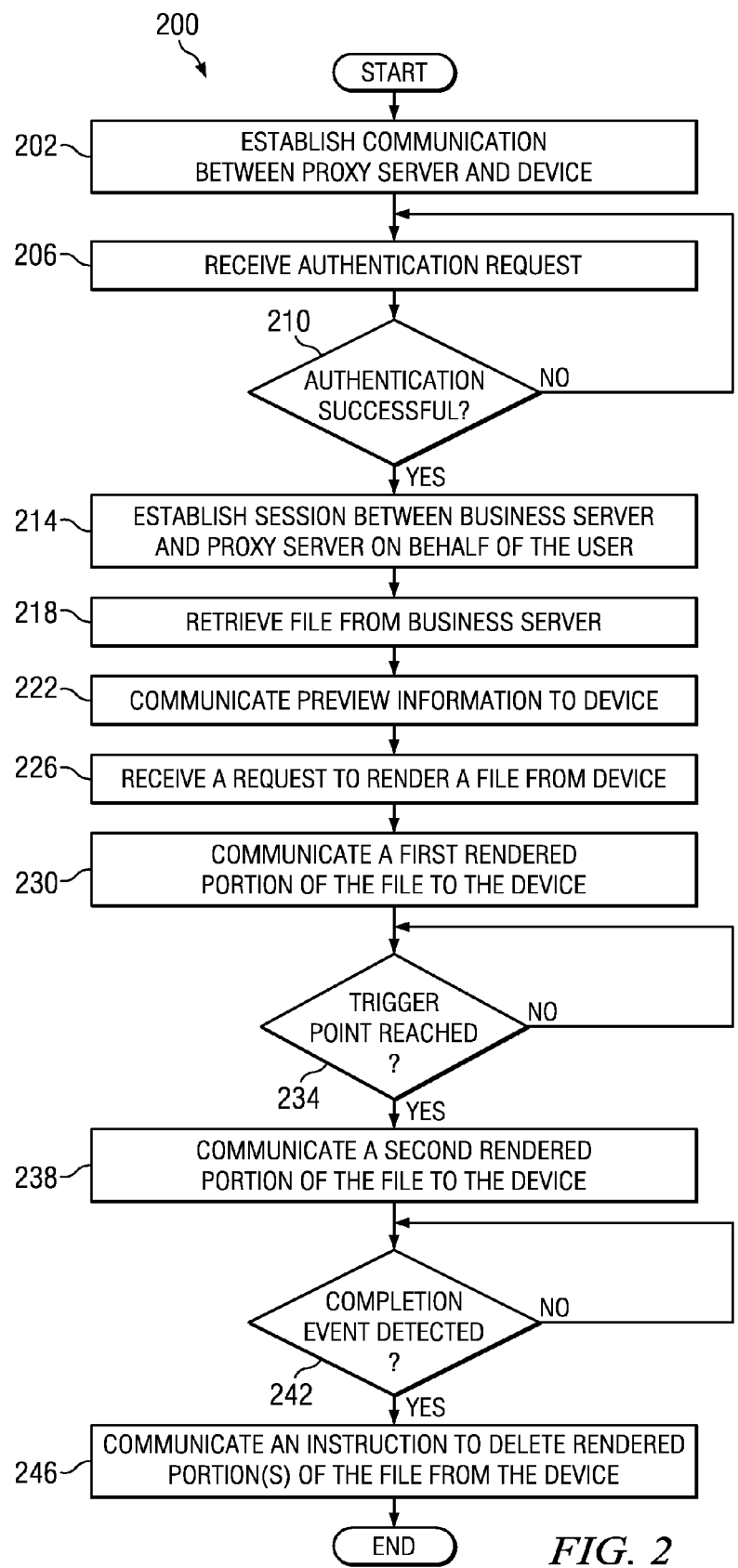
FIG. 2 illustrates an example of a method for securing data access for multi-purpose mobile devices.
Figure 3:
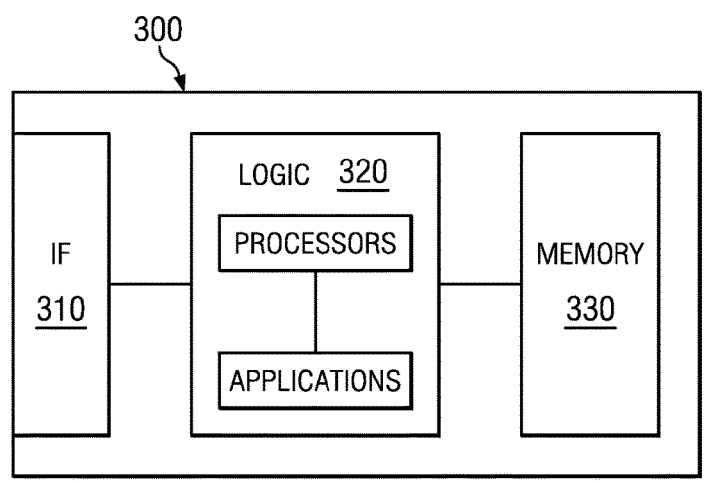
FIG. 3 illustrates examples of elements that may be included in the business server, proxy server, network, and/or devices described with respect to FIG. 1.

Embodiments of the present invention are described in FIGS. 1-3 of the drawings, like numerals being used for like and corresponding parts of the various drawings.

Mobile devices have become one of the basics for providing convenient access to email and other data. Mobile devices may be used to access personal data as well as business data. While some people carry several mobile devices (e.g., one for personal purposes and another for business purposes), it is becoming more and more common for people to consolidate personal data and business data onto one multi-purpose mobile device. Thus, the same mobile device used to store family photographs and personal apps may also be used to access business email, business contacts, business calendars, and other business-related data.

In some cases, each user (rather than the business) chooses his or her particular mobile device from a wide array of devices available on the market. The user will typically choose the device based on the brand, model, service provider, or other criteria that best meets his or her personal purposes. A device chosen based on the user's personal purposes, however, may fail to provide an adequate level of security to business-related data. Thus, the business-related data may be at risk if the device becomes lost or stolen.

One approach to increasing security is to limit the amount of business-related data stored locally on the mobile device. Instead of storing business-related data locally, the data may be stored on a remote server. Accordingly, the mobile device may be required to establish a connection with the remote server in order to access the business-related data. As an example, business-related email may be stored on a cloud server that hosts a webmail application. Unfortunately, conventional webmail may fail to provide a suitable level of performance. For example, webmail may fail to provide the look and feel of the email as it would normally appear if viewed using a data-specific application. As used herein, a data-specific application refers to an application capable of processing a specific type of raw data. For example, Microsoft Outlook™ processes raw .msg data, Microsoft Word™ processes raw .doc data, Adobe Acrobat™ processes raw .pdf data, etc. In addition, conventional webmail may be prone to noticeable delays when scrolling through the webmail message or downloading attachments due to the amount of time that it takes to retrieve data from the remote location.

In order to improve the user experience, a full copy of the business data may be stored in raw data form locally on the mobile device. This approach has drawbacks of its own. For example, data-specific applications used to display native data may be memory and power intensive, particularly for a mobile device having relatively limited resources as compared to a desktop PC. In addition, storing the data locally presents a data security risk in the event that the device is lost or stolen. To address the security risk associated with storing data locally on the device, a business may install a tool on the device that allows for remotely wiping the memory of the device. Note that this approach fails to secure the data during the period of time prior to wiping the memory (i.e., the time that it takes for the user to realize the device is missing and to report it to the business, plus the time that it takes the business to implement the memory wipe). Another drawback of the memory wipe may be the deletion of personal data stored on the device, such as family photos that the user would prefer to leave on the device in case the device is found. In some cases, the device memory may be partitioned into a personal space and a business space so that business-related data may be wiped from memory without wiping personal data. Partitioning the device memory may result in an unsatisfactory allocation of memory (e.g., too much memory allocated to one purpose and not enough memory allocated to the other purpose).

Embodiments of the present invention allow for increasing security by minimizing the amount of data stored on a device, while providing a user experience (e.g., a speed and visual appearance) comparable to that provided when the data is stored locally and executed by a data-specific application. For example, a server may render raw data remotely and then transmit the rendered data to the device. A secure client application on the device may display the rendered data. Displaying the rendered data may be done independently of a data-specific application on the device. Because displaying the rendered data does not require use of the data-specific application on the device, the rendered data may be made inaccessible to applications of the device outside of the secure client application. Thus, the rendered data may be kept securely within the secure client application. This approach also allows resources associated with the outside applications of the device to be conserved for other purposes. In some embodiments, the secure client application may be used to create a virtual workspace for business applications to create, access, modify, and store business documents, business email, or other business data. The virtual workspace may partition the device such that a) personal applications cannot access business data or control business applications located within the virtual workspace, and b) business applications cannot access personal data or control personal applications located outside of the virtual workspace.

FIG. 1 illustrates an example of a system 100 for securing data access for multi-purpose devices. In the illustrated example, system 100 includes a business server 110, a proxy server 130, a network 150, and a plurality of devices 160 coupled as illustrated. In some embodiments, system 100 facilitates securing business data communicated between a business server 110 and a device 160. As an example, system 100 may facilitate securing a business email communicated from business server 110 to device 160. In order to secure the email, business server 110 may communicate the email in raw format to a proxy server 130. Upon a determination that device 160 has been secured (e.g., authenticated and/or communicating via a secure link), proxy server 130 may render the email into a displayable format, such as a bitmap image, and communicate the rendered email to a secure client application of device 160. The secure client application of device 160 may then display the email to a user. To further secure the email, proxy server 130 (or the secure client application) may cause the email to be deleted from device 160 in the event that certain conditions are met, as further described with respect to FIG. 2 below.

Business server 110 may refer to a server that maintains data designated to be kept secure (business data). In some embodiments, business server 110 maintains business data belonging to a party with whom the user of device 160 has a business relationship, such as the user's employer. Examples of business data include various types of raw data files, such as emails (including headers, body, and attachments), word processing files, spreadsheets, presentations, drawings, photographs, calendars, contacts, and so on. Business server 110 may include any suitable business applications 112 to facilitate accessing and storing the business data. For example, business server 110 may include a mail system 112a to facilitate accessing and storing emails, calendars, and/or contacts. In some embodiments, mail system 112a may be implemented using a Microsoft Exchange™ server. Business server 110 may include one or more other applications 112b to facilitate accessing and storing other business data, such as file repository for word processing documents, spreadsheets, photographs, and so on.

Business server 110 may comprise an authentication module 114 that facilitates securing access to the business data. For example, authentication module 114 may ensure that a user has been successfully authenticated before permitting business data to be accessed on behalf of the user. In some embodiments, the user enters login credentials into device 160, device 160 communicates the login credentials to proxy server 130, and proxy server communicates the login credentials to business server 110. Business server 110 processes the login credentials in authentication module 114. Authentication module 114 may determine that the user passes authentication if the login credentials match a user profile that it associates with the user. Once authentication passes, proxy server 130 may be authorized to access business data on behalf of device 160 and to communicate the business data to device 160 for presentation to the user.

Business server 110 and proxy server 130 may communicate over a secure link 116. Secure link 116 may provide a communication path between business server 110 and proxy server 130 over a direct connection (e.g., if business server 110 and proxy server 130 are located at the same site) or an indirect connection (e.g., via one or more networks if business server and proxy server are located remotely from one another). Business server 110 may optionally require proxy server 130 to pass a proxy server authentication procedure in order to establish secure link 116. In some embodiments, secure link 116 may be secured according to the Transport Layer Security (TLS) protocol.

In some embodiments, secure link 116 may be used to communicate email-related messaging between proxy server 130 and mail system 112a of business server 110. Examples of email-related messaging may include getMessage and sendMessage commands. Any suitable protocol or combination of protocols may be used to communicate the email-related messaging. As an example, proxy server 130 may use Internet Message Access Protocol (IMAP) to request an email from mail system 112a (pull mode), mail system 112a may use ActiveSync protocol to automatically send incoming emails to proxy server 130 in real-time (push mode), and/or mail server 112 may communicate the email to proxy server 130 according to Simple Mail Transfer Protocol (SMTP).

The IMAP, ActiveSync, and SMTP standards are traditionally used to send entire copies of numerous emails, calendar entries, and contacts to be stored locally on device 160. Storing the data locally on device 160 allows for a fast response time to the user's request to view the data. However, storing data locally presents security risks. To address these risks, certain embodiments of the present disclosure use these standards to send copies of the data to be temporarily stored on proxy server 130, rather than to device 160 long-term. Proxy server 130 may then provide increased security by controlling the format and nature of the data that gets sent to device 160. As discussed below, proxy server 130 may communicate the data in such a way that the user experience is comparable to having an entire copy of the email stored locally on device 160 (similar look and feel, with a fast response time to user requests).

In some embodiments, agent 134 may communicate commands to a file repository of business server 110 via secure link 116. Examples of commands include readFile and/or writeFile. Such commands may be communicated according to FTP, NFS, webDAV, and/or other suitable protocols.

As used herein, proxy server 130 may refer to hardware and/or software positioned between business server 110 and device 160 and configured to manage device 160's access to data maintained by business server 110. In some embodiments, proxy server 130 may be implemented using a cloud-computing architecture. For example, a business may implement a cloud-based datacenter that includes business server 110 and proxy server 130. As another example, a third party security provider may host proxy server 130 remotely from business server 110 in order to provide security on behalf of the business. In certain alternative embodiments, the proxy server 130 may comprise on-site hardware and/or software that may be directly connected to or installed with business server 110.

Proxy server 130 may comprise one or more interfaces for communicating with devices 160. For example, a first interface may be configured for devices 160 that use a rich client to communicate with proxy server 130. A second interface may be configured for devices 160 that use a thin client to communicate with proxy server 130. The first interface may use a lightweight protocol suited to webservices applications and/or object-oriented design. In some embodiments, the lightweight protocol may use a text-representative format, such as JavaScript Object Notation (JSON) protocol or Extensible Markup Language (XML). The second interface may use HTML or other suitable protocol.

Components of proxy server 130 may include one or more controller(s) 132, agent(s) 134, rendering engine(s) 136, and/or cache(s) 138. Controller 132 may receive a request from device 160, determine tasks to be completed in order to respond to the request, allocate the tasks to one or more components of proxy server 130, and send a response to device 160. For example, if device 160 requests access to business data, controller 132 may allocate the following tasks: agent 134 facilitates authenticating the user with business server 110 and then retrieves the business data in a raw format, rendering engine 136 renders the business data by converting it from the raw format into a rendered format (e.g., a text-representative format and/or a bitmap image) and/or dividing it into a plurality of rendered portions as needed depending on the amount of data, controller 132 communicates a first rendered portion to device 160, and cache 138 caches the remaining rendered portions so that controller 132 may retrieve and communicate each of the remaining rendered portions to device 160 as needed such that device 160 receives the entirety of the requested data without noticeable delay.

Agent 134 may facilitate authenticating device 160 by forwarding login credentials submitted by the user to business server 110. Business server 110 performs authentication and sends the authentication result (pass or fail) to proxy server 130 via agent 134. Thus, in certain embodiments, business server 110 performs authentication as if the user was logging directly into his or her account with business server 110, and proxy server 130 uses the authentication result provided by business server 110. Proxy server 130 may determine to allow or reject subsequent requests from the user based on the authentication result, without having to perform a separate authentication between the user and proxy server 130.

In some embodiments, agent 134 comprises a Mail User Agent configured to act on behalf of the user of device 160 by accessing and managing emails that mail system 112a associates with the user. Agent 134 may communicate with mail system 112a of business server 110 according to any suitable protocol, such as Internet Message Access Protocol (IMAP), Exchange ActiveSync (EAS), Outlook Web Access (OWA), Exchange Web Services (EWS), Post Office Protocol (POP), Simple Mail Transfer Protocol (SMTP), and/or any other suitable protocols. Agent 134 may receive emails in a raw format, such as Multipurpose Internet Mail Extensions (MIME). The emails may include email headers (To, From, CC, BCC, Subject, Date, Time, etc.), the body of the email (text, graphics, etc.), and any attached files (word processing files, spreadsheets, presentations, photographs, etc.). In some embodiments, agent 134 may be configured to retrieve other types of data (in addition to or instead of email messages and attachments) according to any suitable data transfer protocol, such as File Transfer Protocol (FTP), webDAV, or Network File System (NFS).

Rendering engine 132 renders the raw data received from business server 110 via agent 134. In some embodiments, rendering may comprise dividing data into portions, converting data from a raw format to a displayable format, or both. As an example, rendering engine 136 of proxy server 130 may provide the MIME messages in a format selected for fast and secure delivery to device 160. In some embodiments, rendering engine 136 may provide some or all of the email headers in a text-representative format, such as JSON or XML format. The text-representative email headers may be communicated to device 160 as preview information to indicate the emails available in the user's mailbox. In some embodiments, rendering engine 136 may provide the email headers, the body of the email, and/or the attachments as rendered data, such as JSON text (e.g., for short text files) and/or bitmap images (e.g., for longer text files or non-text files). The rendered data may be communicated to device 160 to be displayed to the user. Examples of bitmap formats include BMP, DIB, ILBM, PBM, XBM, WBMP, JPEG, TIFF, PNG, GIF, and so on. As discussed with respect to FIG. 2 below, rendering engine 136 may render the raw email into a plurality of rendered portions so that each portion may be communicated to device 160 as needed. Accordingly, data need not be sent to device 160 until just before the user is ready to view it. For security reasons, data that the user does not wish to view need not be sent to device 160 at all.

Cache 138 may store business data associated with a user within proxy server 130 to allow for faster delivery to the user. As an example, proxy server 130 may optionally include a first cache 138 that stores raw format data (e.g., MIME emails) that has been retrieved from business server 110 before the user requests to view the data. If the user subsequently requests to view the cached data, proxy server 130 may quickly retrieve and render the data from the first cache 138 without incurring the delay associated with pulling the data from business server 110.

As another example, proxy server 130 may optionally include a second cache 138 to cache rendered portions of the data. That is, the raw data may be rendered into a plurality of rendered portions (e.g., as bitmap images) and cached in advance, and each rendered portion may be retrieved from cache 138 and communicated to device 160 such that the time spent rendering the data occurs before the user needs the data. Cached data may optionally be encrypted for increased security.

In some embodiments, cache 138 provides increased security by deleting data associated with a particular user upon termination of the authenticated session corresponding to the user. If the user establishes a subsequent authentication session, proxy server 130 may once again retrieve the user's data from business server 110. In other embodiments, cache 138 may maintain data relatively long-term. Accordingly, business data may be cached by proxy server 130 during the times that the secure client application is connected to proxy server 130, during the times that the secure client application is not connected to proxy server 130, or both. For example, business server 110 may periodically push data to proxy server 130 (or proxy server 130 may pull data from business server 110). Caching the data in advance may allow proxy server 130 to respond quickly to data retrieval requests that it receives from secure client application 162 of device 160.

By performing the above rendering and caching functions at proxy server 130, memory and processing resources of device 160 may be conserved. For example, device 160 may not be required to store large files, to store files long term, or to install/run the data-specific application. In addition, performing the rendering functions at proxy server 130 may allow for support of a wide array of devices 160 because devices 160 need not be required to install any specialized software, such as the data-specific application, in order to view the data.

Use of proxy server 130 may provide increased security to business data. Proxy server 130 may send device 160 only as much data as is needed to support the current activities of the user. Any other data may be kept at proxy server 130 where it can be better protected. To further protect the data, the data may be deleted from device 160 and/or the user may be required to re-authenticate upon a determination that a completion event occurred, such as expiry of a timer or the user logging out of the authenticated session, navigating to a different message, or using a personal app on device 160. Depending on the circumstances and the desired level of security, re-authentication may comprise either a) performing the authentication procedure between device 160 and business server 110 again, b) performing a short authentication procedure between device 160 and proxy server 130 (e.g., entering a PIN), and/or c) performing a short authentication procedure locally at device 160 (e.g., entering a PIN to be verified by the secure client application). Proxy server 130 may be configured to enforce any other security policies, such as policies for disabling a device 160 or for performing lexicon-based filtering. The lexicon-based filtering may be configured to prevent emails containing certain keywords from being delivered to the user via device 160. Examples of such keywords may include "confidential," "privileged," "proprietary," "secret," or customized keywords that the business designates as requiring increased security, such as "Project X."

Turning to device 160, device 160 may include any suitable combination of hardware and/or software, such as a computing system comprising one or more interfaces, logic, and/or one or more memories, which are described in more detail with respect to FIG. 3 below. Device 160 may be a multi-purpose mobile device configured to support a user's business purposes and personal purposes, such as a telephone (e.g., cellular, mobile, or smart), a personal digital assistant, a gaming device, a thin client, a tablet computer, or a laptop computer. In some embodiments, a particular brand/model of device 160 may be chosen by the user to meet the user's personal purposes. Device 160 may communicate with proxy server 130 via a wired or wireless network 150 in order to retrieve business data, such as preview information (e.g., JSON formatted or other text-representative email headers, or other preview information) and rendered data (e.g., JSON formatted or other text-representative email body, bitmap formatted email attachments, or other rendered data) to present to the user via a display.

Device 160 may include a secure client application 162 configured to generate messages to send to proxy server 130 and to process messages received from proxy server 130. As an example, secure client application 162 may generate authentication request messages to send the user's login credentials to proxy server 130. As another example, secure client application 162 may, in response to input from the user, generate requests for proxy server 130 to send business data. Secure client application 162 may receive the business data from proxy server 130 (e.g., in the form of preview information or rendered data) and display the business data to the user. Secure client application 162 may also execute instructions received from proxy server 130, such as instructions to prompt the user to supply login credentials or instructions to delete business data from device 160.

Secure client application 162 may comprise any suitable application, such as a Rich Client or a thin client (e.g. an HTML Client, an HTML Client Wrapper, and/or a Browser). As shown in FIG. 1, secure client application 162*a* illustrates a Rich Client capable of interacting with proxy server 130 using JSON/HTTPS, SOAP, or other suitable protocol. Secure client application 162*b* illustrates a thin client. As an example, thin client 162*b* may comprise an HTML Client, an HTML Client Wrapper, or a Browser that interacts with proxy server 130 via HTML/HTTPS and/or other suitable protocol. Proxy server 130 may support both rich and thin client types in order to facilitate a "bring your own device" approach in which each user selects a device from a number of options. If the selected device does not support a rich client, it may receive secure data from the proxy server using a thin client.

Rich Client 162*a* may be a native device application that presents a login screen, mail boxes, and emails to the user. Rich Client 162*a* may be characterized by good performance and a high quality user experience. Rich Client 162*a* may provide a generic graphical user interface (GUI) comprising the email context, such as menu options (forward, reply, save), field names ("To," "From," "Subject"), and other non-message specific context. An object-oriented webservices interface may be used to provide the message-specific information to populate the message-specific fields of the GUI (e.g., that the subject is "hello" or the message date is "January 1"). For example, proxy server 130 may communicate message-specific information, such as the metadata and text portions of an email, in JSON format sent over HTTPS. Proxy server 130 may choose to communicate email attachments and non-text portions of the email in bitmap format or raw data format depending on the capabilities of device 160 or the policies employed by the system.

Although the preceding example describes Rich Client 162a as displaying rendered data, in certain alternative embodiments, Rich Client 162a may include data-specific code or viewers that execute securely within Rich Client 162a to display data received in raw form. For security reasons, the data-specific code that executes within Rich Client 162a may be distinct from data-specific applications of device 160 that are located outside of Rich Client 162a. In such embodiments, additional security may be provided by controlling the amount of raw data that proxy server 130 delivers to Rich Client 162a at a given time. As an example, proxy server 130 may cache an email in MIME format and make portions of the MIME data available to Rich Client 162a as needed to maintain sufficient security and/or user-responsiveness. The portions may correspond to a number of bits, a number of pages, or other suitable division of data. Steps for sending portions of raw data may be analogous to those for sending rendered portions of data, as described with respect to FIG. 2 below.

As discussed above, examples of thin client 162b include an HTML Client, an HTML Client Wrapper, and a browser. An HTML Client may be a web-based version of client application 162 that displays data similarly to the Rich Client (e.g., JSON formatted email text and bitmap formatted attachments). An HTML Client Wrapper may comprise a thin wrapper application around a native device web module that displays the HTML Client. A browser may comprise a native device browser that can be used to display the HTML Client for devices that are not configured with a Rich Client or an HTML Client Wrapper. Use of thin client 162b may allow for proxy server 130 to support a wide array of device types, including device types for which a Rich Client application is not yet available. In some embodiments, functionality for aesthetic presentation of data may be provided by proxy server 130, for example, if device 160's secure client application 162 does not support such capabilities. As an example, the thin client may receive a generic GUI via HTML populated with message-specific data.

In certain embodiments, secure client application 162 comprises synchronous communication on multiple threads, asynchronous communication, or a combination of both. Secure client application 162 may be based on any suitable protocol, such as Asynchronous JavaScript and XML (AJAX), Simple Object Access Protocol (SOAP), WebSockets, raw sockets, or other synchronous or asynchronous protocol. The use of asynchronous or multi-threaded synchronous communication may allow secure client application 162 to obtain data from proxy server 130 in the background before the user requests the data. For example, secure client application 162 may retrieve the next page of a document that the user is scrolling through before the user gets to the end of the current page. As another example, thin client 162b may retrieve a generic GUI from proxy server 130 in advance so that by the time the user selects a message, most or all of the data that remains to be retrieved is message-specific.

In certain embodiments, secure client application 162 may provide a partition between business data and personal data. For example, business data may be inaccessible outside of secure client application 162 and/or personal data may be inaccessible within secure client application 162. Partitioning may prevent business data from being copied or stored into low security portions of device 160. In addition, partitioning may eliminate the need for the business to monitor or restrict how the user uses device 160 outside of secure client application 162. Thus, the user may be free to download personal apps or other personal data onto the device. Moreover, the amount of device resources used by secure client application 162 may be minimal. For example, proxy server 130 may provide only the data that the user is actively using, such as one or two emails and their attachments, and secure client application 162 may delete any data that the user is not actively using (as long as the user is authenticated, the deleted data may be re-sent by proxy server 130 if the user needs it again in the future). Accordingly substantial memory and processing power may be available to meet the user's personal purposes. In certain embodiments, the partitioning may be performed dynamically based on the resources that secure client application 162 needs to support its current operations and its anticipated next operations. Thus, it may be unnecessary to permanently reserve resources to secure client application 162, and the resources may be freed up for use by other applications when client application 162 does not need to use them.

Components of the systems and apparatuses disclosed may be coupled by any suitable communication network, such as network 150. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although certain components of system 100 have been described in the context of securing email, analogous components may be used to secure other types of data, such as other files associated with a virtual workspace (e.g., text or word processing files, presentations, spreadsheets, photographs, drawings, calendars, contacts, and so on). In addition, components and protocols shown in FIG. 1 have been provided for purposes of example and illustration. More, fewer, or other protocols and components may be used without departing from the scope of the invention.

FIG. 2 illustrates an example of a method 200 for securing data access for a multi-purpose mobile device. For purposes of example and illustration, method 200 describes steps for securing access to email data. Analogous steps may be used to secure other types of data, such as other files associated with a virtual workspace (e.g., text or word processing files, presentations, spreadsheets, photographs, drawings, calendars, contacts, and so on).

The method begins at step 202 by establishing a communication path between proxy server 130 and device 160. Communication may be established through any suitable number or arrangement of interconnected networks 150 including wired and/or wireless networks. By way of example, device 160 may communicate with a wireless network according to a wireless communication protocol such as AMPS, CDMA, TDMA, GSM, iDEN, GPRS, EDGE, UMTS, WCDMA, WLAN/WiFi, WiMax, BlueTooth, or their variants, among others. The wireless network may interface with a back-end network that includes proxy server 130 in communication with business server 110. The device 160-proxy server 130 communication path and the proxy server 130-business server 110 communication path may be secured according to any suitable protocol, such as Secure Socket Layer (SSL) protocol or Transport Layer Security (TLS) protocol. In some embodiments, proxy server 130 may verify that device 160 is communicating via secure client application 162. Proxy server 130 may deny requests for data that originate outside of secure client application 162.

At step 206, proxy server 130 receives an authentication request from device 160. In some embodiments, the authentication request may comprise login credentials supplied by a user of device 160. Device 160 may prompt the user to provide the login credentials at any suitable time, such as upon a determination that a maximum amount of time has elapsed since a previous authentication, in response to receiving an instruction from proxy server 130 instructing device 160 to assist in authentication, or when the user launches secure client application 162 (the application that allows the user to access data from business server 110 via proxy server 130). In some embodiments, the login credentials may include a user identifier and a passcode. Examples of user identifiers include a user name or user number. Examples of passcodes include a string of one or more letters, numbers, punctuation marks, or other characters, such as a password or PIN previously configured by the user, a string of characters generated by a token in the user's possession, biometric data, facial recognition, visual patterns, or a combination.

After receiving the authentication request, proxy server 130 determines whether the device successfully passes authentication at step 210. In some embodiments, proxy server 130 forwards the login credentials to business server 110, and business server 110 performs authentication. Accordingly, proxy server 130 determines whether or not authentication was successful based on the authentication response received from business server 110. In some alternative embodiments, proxy server 130 may perform the authentication itself. For example, proxy server 130 may determine that authentication passes if the login credentials received in the authentication request match the login credentials of an existing profile associated with the user.

If authentication fails, the method may return to step 206 to provide the user the opportunity to make a correction to the login credentials. In some embodiments, if the number authentication failures exceeds a threshold for maximum authentication attempts, device 160 may be locked out of the proxy server 130, business server 110, or both, and/or a system administrator may be notified. If authentication passes, the method proceeds to step 214 where proxy server 130 establishes a session with business server 110 on behalf of the user. In certain embodiments, establishing a session between business server 110 and proxy server 130 may optionally include authenticating proxy server 130 (in addition to authenticating the user of device 160).

At step 218, proxy server 130 retrieves emails (or portions of emails) that business server 110 associates with the user. Proxy server 130 may retrieve any suitable subset of emails, such as the n number of most recent emails, emails received within a recent timeframe (e.g., hour, day, week, month), the emails flagged as high priority, the unread emails, the emails that match the user's search criteria (e.g., by sender, keyword, etc.), or all of the user's emails. Proxy server 130 may retrieve the emails according to a push mode, a pull mode, or both. In the push mode, business server 110 may automatically push a new email (or a message waiting notification) to proxy server 130 in response to receiving an incoming email from a sender. In the pull mode, proxy server 130 periodically requests business server 110 to provide new emails (if any) and/or additional content associated with the emails that proxy server 130 already knows about.

The method proceeds to step 222 where proxy server 130 communicates preview information to device 160. In some embodiments, preview information and other data communicated to device 160 from proxy server 130 may be accessible to secure client application 162 (the business application) and may be inaccessible to other applications of device 160 (the personal applications). Secure client application 162 of device 160 displays the preview information to the user. The preview information provides a relatively small amount of data to allow the user to decide whether or not to view other portions of the email. As an example, the preview information may comprise the subject line, the timestamp, and/or the name of the sender. As another example, the preview information may comprise the filename of an email attachment. In some embodiments, the preview information may have a text format, such as JSON formatted text that can be viewed by a Rich Client or an HTML Client.

The user may select one of the emails to view based on the preview information. In response to the user selecting the email, secure client application 162 may generate a request to render the selected email. The request may be formatted according to the JSON protocol or other suitable protocol. Device 160 sends the request to render the email to proxy server 130, and proxy server 130 receives the request at step 226.

Upon receiving the request to render the email, proxy server 130 may retrieve the email from business server 110 or from cache 138 (if business server 110 previously provided the email to proxy server 130). Proxy server 130 may render the email by dividing it into portions and/or converting it to a displayable format. Proxy server 130 may divide the message into a plurality of rendered portions to facilitate transmitting the message to device 160 quickly. The message may be divided into any suitable number of portions (2, 3, 4, . . . n portions) depending on the format and nature of the data, the message size, the capabilities of secure client application 162, and so on. Each rendered portion may contain any suitable amount of data. In some embodiments, the amount of data per portion may be selected such that only the data that is immediately viewable to the user is sent to device 160 at one time. The data that is immediately viewable to the user may be determined based on the immediate display capabilities of the secure client application of device 160. That is, proxy server 130 may approximate the amount of data that secure client application 162 may display at one time to determine how much data to include in a particular portion.

In some embodiments, page breaks in the data may be used to determine where each rendered portion should begin and end. For example, one rendered portion may correspond to one, two, three, or more pages of the email body or attachments. Proxy server 130 may determine the location of page breaks based on page break identifiers located within the raw data. Proxy server 130 may also approximate the location of page breaks based on the amount of data that proxy sever 120 anticipates secure client application 162 is capable of displaying at a time (e.g., within one screen). The approximation may be based on screen-page size information provided by secure client application 162, or it may be based on a range of screen-page sizes typically used by device displays.

Converting data into a displayable format may allow the data to be displayed independently of the raw data-specific application. Examples of raw formats include email formats (e.g., MIME), word processing formats (e.g., DOC or PDF), presentation formats (e.g., PPT), and spreadsheet formats (e.g., XLS). Examples of rendered formats include text-representative formats, such as JSON, XML, etc., as well as bitmap formats, such as BMP, DIB, ILBM, PBM, XBM, WBMP, JPEG, TIFF, PNG, GIF, and so on. The bitmap image provides a visual appearance comparable to what the user would see if the raw data message were opened in its data-specific application (e.g., if the raw data includes formatted text and graphics, the bitmap image shows a snapshot of the formatted text and graphics rather than some combination of unformatted text, hyperlinks, truncated data, white space, or other placeholders that characterize conventional webmail viewed from a mobile phone).

At step 230, proxy server 130 communicates one or more rendered portions of the email to device 160. Secure client application 162 of device 160 displays the rendered portion to the user. Thus, if the rendered data is in bitmap format the user may view the content of the email without having the actual raw data format of the message stored on device 160. In some embodiments, proxy server 130 times the sending of the rendered portions dynamically so that the sequential rendered portions that make up a particular email arrive at device 160 as needed. Because the rendered portions may be kept relatively small, device 160 may receive and display each rendered portion relatively quickly. The user experience may be improved because the user can start viewing the beginning of the message without having to wait for the entire message to download. In addition, security may be increased because proxy server 130 need not send portions of the message to device 160 that the user does not wish to view. For example, after reading the rendered portions comprising the body of an email "A," a user may decide that it is unnecessary to view the attachments associated with email A. Accordingly, proxy server 130 need not send the attachments to device 160, so the risk of the attachments falling into the wrong hands is minimized.

In order to maintain the application speed experienced by the user, proxy server 130 may send a first rendered portion to device 160, anticipate when the user will want to view a second rendered portion, and communicate the second rendered portion to device 160 in advance so that the second rendered portion is available when the user wants it. Thus, the user experience may be comparable to viewing raw data stored locally on device 160 using a data-specific application. Accordingly, in some embodiments, proxy server 130 communicates a first rendered portion of the message to device 160 at step 230. As an example, first rendered portion may comprise the first two pages of an email attachment.

At step 234, proxy server 130 determines whether a trigger point was reached. As an example, proxy server 130 may determine that trigger point was reached if a certain amount of time has elapsed since sending the previous rendered portion or upon receiving a notification from device 160. In some embodiments, proxy server 130 communicates the location of the trigger point to secure client application 162 of device 160. The location of the trigger point may be communicated in any suitable manner. For example, the location may be embedded in the rendered portion or it may be communicated in a control message. Proxy server 130 instructs secure client application 162 to detect when the trigger point is reached and to notify proxy server 130 accordingly. Or, secure client application 162 may maintain a policy indicating when to notify proxy server 130 that a trigger point was reached. The trigger point may be positioned prior to the end of the first rendered portion. Continuing with the example above wherein the first rendered portion comprises the first two pages of an email attachment, the trigger point may correspond to the end of the first page. Thus, the trigger point would be reached when the user scrolls from the first page to the second page of the attachment. Upon determining that the trigger point was reached, the method proceeds to step 238.

At step 238, proxy server 130 communicates a second rendered portion of the message in response to determining that the trigger point of the first rendered portion was reached. Proxy server 130 and/or secure client application may anticipate the information that the user would like to view next in order to make the data available to the user in a timely fashion. The anticipated information may be included in the second rendered portion. For example, proxy server 130 and/or secure client application 162 may anticipate that the user would like to view information in sequence. Thus, after viewing the first and second pages of an email attachment, proxy server 130 and/or secure client application 162 may anticipate that the user would like to view the third and fourth pages of the email attachment. Accordingly, proxy server 130 may communicate the third and fourth pages in the second rendered portion so that the user may continue scrolling through the attachment without having to click "more" or "next page" and waiting for device 160 to download the next pages. That is, by anticipating the information that the user would like to view next, the information may be sent to device 160 in advance so that the user does not perceive delays in accessing the information.

For security purposes, certain embodiments may store the rendered portions in memory accessible to secure client application 162, but inaccessible to other applications of device 160. For security purposes, the rendered portions may be stored on device 160 temporarily such that the rendered portions associated with a particular email may be deleted from local memory of device 160 upon a determination that a competition event occurred. Thus, if device 160 later becomes lost or stolen, a third party may be prevented from accessing the email. The user may regain access to the email by passing authentication and re-requesting the email from proxy server 130.

At step 242, the method detects whether a completion event occurred. The completion event may be configured to predict when the user is likely finished viewing the email. Examples of completion events may include the user closing the email, the user moving to a different email, the user accessing an application external to secure client application 162, or determining that device 160 has been de-authenticated (e.g., if the user logs off or closes secure client application 162, if device 160 powers down, upon the expiration of an idle time or other session timer, or upon a determination that a communication link between proxy server 130 and device 160 has become disconnected or insufficiently secure). Upon determining that the completion event occurred, the method proceeds to step 246.

At step 246, device 160 deletes the rendered portion(s) from memory. For example, device 160 may delete rendered portions in response to an instruction from proxy server 130. Or, secure client application 162 may apply a policy that indicates the rules for deleting data. The rules may define the completion events, the duration of idle timer(s) or session timer(s), and so on. The policy may be pushed to secure client application 162 from proxy server 130, or the policy may be pre-configured as a part of secure client application 162.

In some embodiments, secure client application 162 may maintain the rendered portions corresponding to the most recently viewed email(s) in memory after a completion event occurs on the condition that the email(s) cannot be displayed to the user until security has been cleared (e.g., user must enter a PIN or re-authenticate to secure client application 162, proxy server 130, and/or business server 110).

After deleting the rendered portions at step 246, device 160 may no longer store a local copy of the email. However, business server 110 and/or proxy server 130 may maintain the email in raw form and/or rendered form after the rendered portions have been deleted from device 160. In other words, deleting the email from the device for security purposes is done independently of deleting the email from the mail server/proxy server. There may be circumstances in which device 160 deletes rendered portions for reasons other than security. For example, device 160 may delete rendered portions in response to a command from the user. In that case, device 160 may communicate an instruction to delete the corresponding email from proxy server 130 and business server 110. After deleting the rendered portions from device 160, the method then ends.

Although the preceding method has been described in the context of proxy server 130 retrieving data from business server 110 after the connection with secure client application 162 is up and authenticated, in alternative embodiments proxy server 130 may obtain data from business server 110 during the times that secure client 162 is not connected/authenticated. For example, proxy server 130 may use OAuth (on behalf of authentication) or stored user credentials to obtain user data in advance. Data may be obtained according to a push mode, a pull mode, or a combination of modes. Proxy server 130 may cache the data to facilitate quick retrieval by secure client application 162 once secure client application 162 is connected and authenticated.

FIG. 3 illustrates an example of elements 300 that may be included in the systems and apparatuses disclosed herein. For example, any of business server 110, proxy server 130, network 150, and/or device 160 may include an interface 310, logic 320, memory 330, and/or other suitable element. Interface 310 receives input, sends output, processes the input and/or output, and/or performs other suitable operation. Interface 310 may comprise hardware and/or software.

Logic 320 performs the operations of the component, for example, executes instructions to generate output from input. Logic 320 may include hardware, software, and/or other logic. Logic 320 may be encoded in one or more tangible media and may perform operations when executed by a computer. Certain logic, such as a processor, may manage the operation of a component. Examples of a processor (or processing unit) include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 330 (or memory unit) stores information. Memory 330 may comprise one or more non-transitory, tangible, computer-readable, and/or computer-executable storage media. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. As an example, determinations whether to delete data from secure client application 162 may be made by proxy server 130, by secure client application 162, or both. As another example, a generic user interface may be provided by proxy server 130 (e.g., in the case of a Thin Client) or by secure client application 162 (e.g., in the case of a Rich Client). As another example, raw data may be rendered by proxy server 130, or portions of the raw data may be sent to secure client application 162 (e.g., in certain embodiments of the Rich Client) to be processed and displayed securely within secure client application 162. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order. For example, the methods may authenticate more, fewer, or other authentication factors, and the authentication factors may be verified in any suitable order. Authentication may be performed between any suitable components. For example, business server 110 may authenticate proxy server 130, device 160, and/or the user of device 160. Proxy server 130 may optionally authenticate device 160, client application 162, and/or the user of device 160. Alternatively, proxy server 130 may defer to business server 110 and/or secure client application 162 to authenticate the user. Secure client application 162 may authenticate the user locally.

Some embodiments of the disclosure may provide one or more technical advantages. A technical advantage of some embodiments may be that a security system comprising a remote server and a secure client application executed on the user's mobile device determines what business data to communicate to a user's mobile device, how much business data to communicate to the device, and when to delete the business data from the device. Thus, security over the business data may be effected by the security system without relying on the user of the device to secure the business data. As an example, the security system may enforce security policies configured to allow certain business data to be temporarily displayed to the user (e.g., when the user is authenticated and actively using the data) and then deleted from the device (e.g., when the user is de-authenticated or not actively using the data). Because security does not depend on the user, it may be possible to minimize the local restrictions or controls that the user's business might otherwise place on the user's mobile device. For example, the business may do away with restrictions on the type/brand/ model of device the user may use. Accordingly, the user may select the mobile device that meets the user's personal needs, even if the device has relatively few security features installed/activated locally. As an example, the device need not have the capability to wipe its entire memory (personal data and business data) in the event that it becomes lost or stolen. As another example, the device need not have large amounts of local memory reserved exclusively for business data.

Another technical advantage of some embodiments may be that the security of business data may be increased by making it available to minimal resources of the device. For example, in some embodiments, the business data may be available to only a secure client application, such as a browser on the device. The secure client application may be configured to prevent the business data from being copied into other applications or memory of the device. With the business data secured, the business need not monitor or restrict the personal data stored elsewhere on the device. Accordingly, the user may download whatever personal apps that the user would like to download.

Another technical advantage of some embodiments may be that data communicated to the device from a remote server may have a look and feel comparable to data stored locally on the device and executed by a data-specific application installed on the device. In some embodiments, the server may render the raw data on behalf of the device and communicate the rendered data in an image format. The image format may be viewed using minimal resources of the device and without requiring the device to install/run the data-specific application.

To minimize both the security risks and the amount of local device resources required to support the business data, the amount of data communicated to the device at any given time may be no more than what is needed to support the user's current activities. For example, the pages of a document may be communicated one page at a time. To maintain the user experience, in certain embodiments the server may anticipate the next piece of data that the user would likely want to see (e.g., the next page of the document) and may render and send the next piece of data to the device in advance. Thus, the user may continue to flip through the pages of the document without noticeable delays and without having to send follow-up requests to the server requesting the next page of the document. Previously provided pages of the document may be left on the device as long as the user is viewing the document to allow the user to scroll backwards in the document and re-read an earlier page.

Another technical advantage of some embodiments is that a "push" model of email delivery may be emulated without having to send the raw data mail message for storage on the device. The push model of email delivery automatically alerts the user of an incoming email in response to receiving the email from a sender (without the user having to periodically request whether or not a new email was received). In some embodiments, the server may push a message waiting alert or a preview of the email to the device. The user may request to view the email corresponding to the alert/preview, and the server may provide a rendered version of the email to the device if the security policy has been met (e.g., if the user has been authenticated).

Another technical advantage may be that a proxy server communicates policies to a secure client application. The policies contain rules that facilitate securing data. For example, a rule may indicate that secure client application may or may not access certain types of data based on its current GPS location. Another rule may indicate authentication requirements, such as the type(s) of authentication to be performed and how frequently to perform each type of authentication. Another rule may indicate completion events, such as navigating to a different file, accessing applications outside of the secure client application, expiration of a timer (and the duration setting of that timer), etc. Another rule may indicate how to determine whether a trigger point was reached in a file (e.g., based on page breaks in the data, the amount of data, or other criteria).

Some embodiments may benefit from some, none, or all of these advantages. Other technical advantages may be readily ascertained by one of ordinary skill in the art.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A proxy server comprising one or more hardware processors operable to:
    establish communication with a secure client application of a device, the secure client application comprising a partition configured to contain data received from the proxy server within the secure client application;
    receive an authentication request from the secure client application, the authentication request comprising authentication information associated with a user account;
    determine that the secure client application passes authentication;
    receive one or more files associated with the user account, the files received from a business server in a raw data format;
    determine preview information for the one or more files;
    communicate the preview information to the secure client application;
    receive a request from the secure client application requesting a first selected file, the first selected file corresponding to one of the files of the preview information;
    divide the first selected file into at least a first portion and a second portion based on the immediate display capabilities of the secure client application, wherein each portion is based on an amount of data of the first selected file that is viewable on the device at one time;
    communicate the first portion of the first selected file to the secure client application;
    determine, using at least one of the hardware processors, that a trigger point positioned within the first portion of the file was reached, the trigger point configured to anticipate that a user will next want to view the second portion of the first selected file and to facilitate communicating the second portion of the first selected file in advance;
    communicate the second portion of the first selected file to the secure client application in response to determining that the trigger point was reached and independently of a user-initiated command to view the second portion;
    determine that a completion event occurred, the completion event comprising a prediction that a user has completed viewing of the first selected file; and
    communicate, to the secure client application in response to determining that the completion event occurred, an instruction to delete the first portion and the second portion of the selected file from the secure client application.

2. The proxy server of claim 1, the one or more processors further operable to:
  maintain the first selected file subsequent to communicating the first and second portions to the secure client application;
  receive a request from the secure client application subsequent to the completion event, the request requesting the proxy server to re-send the first selected file; and
  communicate the first portion of the first selected file to the secure client application.

3. The proxy server of claim 2, wherein the completion event comprises the expiration of a timer.

4. The proxy server of claim 2, wherein the completion event comprises the user requesting to view a second selected message.

5. The proxy server of claim 2, wherein the completion event comprises the user exiting the secure client application.

6. The proxy server of claim 1, the one or more processors further operable to communicate a policy to the secure data application, the policy indicating rules for determining whether the completion event occurred.

7. The proxy server of claim 1, the secure client application further configured to:
  determine that the user has become de-authenticated;
  prompt the user to provide authentication information associated with a local authentication procedure; and
  perform the local authentication procedure using the authentication information provided by the user.

8. The proxy server of claim 1, the one or more processors further operable to:
  determine that the secure client application comprises a thin client; and
  communicate a generic graphical user interface to the thin client and message-specific information.

9. The proxy server of claim 1, wherein:
  the secure client application comprises a rich client; and
  the one or more processors further operable to establish communication with a second secure client application of a second device in order to communicate secure data to the second secure client application, the second device having a different type than the first device, the second secure client application comprising a thin client.

10. The proxy server of claim 1, the one or more processors further operable to:
  communicate one or more policies comprising rules for determining timeout values and authentication rules.

11. The proxy server of claim 1, the one or more processors further operable to:
  determine that the secure client application comprises a rich client, the rich client configured to locally provide a generic graphical user interface; and
  determine to communicate message-specific portions of the first selected file to the rich client without communicating the generic graphical user interface.

12. The proxy server of claim 1, the one or more processors configured to receive requests sent from the secure client application according to an asynchronous or multi-threaded synchronous protocol.

13. The proxy server of claim 1, the one or more processors configured to communicate the first and second portions according to an object-oriented web service interface.

14. The proxy server of claim 1, the one or more processors configured to communicate the first portion according to a text-representative format.

15. The proxy server of claim 1, the one or more processors configured to render the first portion into a bitmap, wherein the one or more processors communicate the first portion in bitmap form.

16. A non-transitory computer-readable medium comprising logic, the logic when executed by one or more processing units operable to:
  establish communication with a secure client application of a device, the secure client application comprising a partition configured to contain data received from the logic within the secure client application;
  receive an authentication request from the secure client application, the authentication request comprising authentication information associated with a user account;
  determine that the secure client application passes authentication;
  receive one or more files associated with the user account, the files received from a business server in a raw data format;
  determine preview information for the one or more files;
  communicate the preview information to the secure client application;
  receive a request from the secure client application requesting a first selected file, the first selected file corresponding to one of the files of the preview information;
  divide the first selected file into at least a first portion and a second portion based on the immediate display capabilities of the secure client application, wherein each portion is based on an amount of data of the first selected file that is viewable on the device at one time;
  communicate the first portion of the first selected file to the secure client application;
  determine that a trigger point positioned within the first portion of the file was reached, the trigger point configured to anticipate that a user will next want to view the second portion of the first selected file and to facilitate communicating the second portion of the first selected file in advance;
  communicate the second portion of the first selected file to the secure client application in response to determining that the trigger point was reached and independently of a user-initiated command to view the second portion;
  determine that a completion event occurred, the completion event comprising a prediction that a user has completed viewing of the first selected file; and
  communicate, to the secure client application in response to determining that the completion event occurred, an instruction to delete the first portion and the second portion of the selected file from the secure client application.

17. The non-transitory computer-readable medium of claim 16, the logic further operable to:
  maintain the first selected file subsequent to communicating the first and second portions to the secure client application;
  receive a request from the secure client application subsequent to the completion event, the request requesting a re-sending of the first selected file; and
  communicate the first portion of the first selected file to the secure client application.

18. The non-transitory computer-readable medium of claim 17, wherein the completion event comprises the expiration of a timer.

19. The non-transitory computer-readable medium of claim 17, wherein the completion event comprises the user requesting to view a second selected message.

20. The non-transitory computer-readable medium of claim 17, wherein the completion event comprises the user exiting the secure client application.

21. The non-transitory computer-readable medium of claim 16, the logic further operable to communicate a policy to the secure data application, the policy indicating rules for determining whether the completion event occurred.

22. The non-transitory computer-readable medium of claim 16, the secure client application further configured to:
determine that the user has become de-authenticated;
prompt the user to provide authentication information associated with a local authentication procedure; and
perform the local authentication procedure using the authentication information provided by the user.

23. The non-transitory computer-readable medium of claim 16, further operable to:
determine that the secure client application comprises a thin client; and
communicate a generic graphical user interface to the thin client and message-specific information.

24. The non-transitory computer-readable medium of claim 16, wherein:
the secure client application comprises a rich client; and
the logic further operable to establish communication with a second secure client application of a second device in order to communicate secure data to the second secure client application, the second device having a different type than the first device, the second secure client application comprising a thin client.

25. The non-transitory computer-readable medium of claim 16, further operable to:
determine that the secure client application comprises a thin client; and
communicate with the thin client via HTML/HTTPS.

26. The non-transitory computer-readable medium of claim 16, the logic further operable to:
determine that the secure client application comprises a rich client, the rich client configured to locally provide a generic graphical user interface; and
determine to communicate message-specific portions of the first selected file to the rich client without communicating the generic graphical user interface.

27. The non-transitory computer-readable medium of claim 16, the logic further operable to receive requests sent from the secure client application according to an asynchronous or multi-threaded synchronous protocol.

28. The non-transitory computer-readable medium of claim 16, the logic further operable to communicate the first and second portions according to an object-oriented web service interface.

29. The non-transitory computer-readable medium of claim 16, the logic further operable to communicate the first portion according to a text-representative format.

30. The non-transitory computer-readable medium of claim 16, the logic further operable to render the first portion into a bitmap, wherein the logic communicates the first portion in bitmap form.

31. A proxy server comprising one or more hardware processors operable to:
determine that a secure client application associated with a user of a device passes authentication;
receive one or more files associated with the user from a business server, the files received in a raw format;
receive a request from the secure client application requesting a selected one of the files;
determine a data format for communicating with the secure client application based on whether the secure client application comprises a rich client or a thin client;
divide, using at least one of the hardware processors, the selected file into portions based on the immediate display capabilities of the secure client application, the portions formatted according to the data format, wherein each portion comprises an amount of data of the selected one of the files that is viewable on the device at one time;
communicate each portion of the selected file to the secure client application on an as-needed basis using one or more trigger points positioned within each portion of the selected file, the one or more trigger points of each portion of the selected file configured to anticipate the next portion that the user will want to view and to facilitate communicating the next portion in advance, the communicating performed when a trigger point in a current portion is reached independently of a user-initiated command to view the next portion;
determine that a completion event occurred, the completion event comprising a prediction that a user has completed viewing of the first selected file; and
communicate, to the secure client application in response to determining that the completion event occurred, an instruction to delete the one or more portions of the selected file from the secure client application.

32. The proxy server of claim 31, the one or more processors further operable to perform lexicon-based filtering to determine whether the files are authorized to be sent to the secure client application.

33. The proxy server of claim 31, wherein to use the trigger point, the one or more processors:
communicate a first portion of the selected file;
determine that the trigger point was reached, the trigger point positioned prior to the end of the first portion; and
communicate a second portion of the selected file in response to determining that the trigger point was reached.

34. The proxy server of claim 31, the immediate display capabilities of the secure client application determined by approximating the size of a screen-page of the device.

35. The proxy server of claim 31, the one or more processors further operable to communicate preview information to the secure client application, the preview information describing the files available to the secure client application.

36. The proxy server of claim 31, wherein the one or more processors further operable to:
maintain the file at the proxy server subsequent to communicating the instruction to delete the file from the secure client application.

37. The proxy server of claim 36, wherein the completion event comprises receiving a request to close the selected file, receiving a request to select a different file, or determining that the device has become de-authenticated.

38. The proxy server of claim 31, wherein the one or more processors use object-oriented webservices messages to communicate the preview information and the one or more portions of the selected file.

39. The proxy server of claim 38, wherein the object-oriented webservices messages are configured to populate file-specific information into a generic graphical user interface provided by the secure client application, the secure client application comprising a rich client.

40. The proxy server of claim 31, further comprising an interface configured to facilitate communication with the secure client application, the secure client application comprising an HTML client, an HTML client wrapper, or a browser.

41. The proxy server of claim 31, the one or more processors further operable to:
communicate with the secure client application using a first protocol if the secure client application comprises a thin client; and
communicate with the secure client application using a second protocol if the secure client comprises a rich client.

42. The proxy server of claim 31, the data format comprising a text-representative format or a bitmap format.

43. The proxy server of claim 31, the one or more processors further operable to instruct the secure client application to initiate authentication in response to:
a timer expiration;
determining the user has opened the secure client application; or
determining the user has accessed an application outside of the secure client application.

44. The proxy server of claim 31, wherein:
the selected file comprises an email; and
the portions of the file include a first portion and a second portion, wherein:
the first portion comprises a body of the email formatted according to a text-representative format or a bitmap format; and
the second portion comprises a page of an attachment of the email formatted according to a raw data format or the bitmap format.

45. A non-transitory computer-readable medium comprising logic, the logic when executed by one or more processing units operable to:
determine that a secure client application associated with a user of a device passes authentication;
receive one or more files associated with the user from a business server, the files received in a raw format;
receive a request from the secure client application requesting a selected one of the files;
determine a data format for communicating with the secure client application based on whether the secure client application comprises a rich client or a thin client;
divide the selected file into portions based on the immediate display capabilities of the secure client application, the portions formatted according to the data format, wherein each portion comprises an amount of data of the selected one of the files that is viewable on the device at one time;
communicate each portion of the selected file to the secure client application on an as-needed basis using one or more trigger points positioned within each portion of the selected file, the one or more trigger points of each portion of the selected file configured to anticipate the next portion that the user will want to view and to facilitate communicating the next portion in advance, the communicating performed when a trigger point in a current portion is reached independently of a user-initiated command to view the next portion;
determine that a completion event occurred, the completion event comprising a prediction that a user has completed viewing of the first selected file; and
communicate, to the secure client application in response to determining that the completion event occurred, an instruction to delete the one or more portions of the selected file from the secure client application.

46. The non-transitory computer-readable medium of claim 45, the logic further operable to perform lexicon-based filtering to determine whether the files are authorized to be sent to the secure client application.

47. The non-transitory computer-readable medium of claim 45, wherein to use the trigger point, the logic further operable to:
communicate a first portion of the selected file;
determine that the trigger point was reached, the trigger point positioned prior to the end of the first portion; and
communicate a second portion of the selected file in response to determining that the trigger point was reached.

48. The non-transitory computer-readable medium of claim 45, the immediate display capabilities of the secure client application determined by approximating the size of a screen-page of the device.

49. The non-transitory computer-readable medium of claim 45, the logic further operable to communicate preview information to the secure client application, the preview information describing the files available to the secure client application.

50. The non-transitory computer-readable medium of claim 45, the logic further operable to:
maintain the file at the proxy server subsequent to communicating the instruction to delete the file from the secure client application.

51. The non-transitory computer-readable medium of claim 50, wherein the completion event comprises receiving a request to close the selected file, receiving a request to select a different file, or determining that the device has become de-authenticated.

52. The non-transitory computer-readable medium of claim 51, wherein the one or more processors use object-oriented webservices messages to communicate the preview information and the one or more portions of the selected file.

53. The non-transitory computer-readable medium of claim 52, wherein the object-oriented webservices messages are configured to populate file-specific information into a generic graphical user interface provided by the secure client application, the secure client application comprising a rich client.

54. The non-transitory computer-readable medium of claim 51, the logic further operable to facilitate communication with the secure client application, the secure client application comprising an HTML client, an HTML client wrapper, or a browser.

55. The non-transitory computer-readable medium of claim 45, wherein the data format comprises a text-representative format or a bitmap format.

56. The non-transitory computer-readable medium of claim 45, the logic further operable to instruct the secure client application to initiate authentication in response to:
a timer expiration;
determining the user has opened the secure client application; or determining the user has accessed an application outside of the secure client application.

57. The non-transitory computer-readable medium of claim 45, wherein:
the selected file comprises an email; and
the portions of the file include a first portion and a second portion, wherein:
the first portion comprises a body of the email formatted according to a text-representative format; and
the second portion comprises a page of an attachment of the email formatted according to a bitmap format.

\* \* \* \* \*